United States Patent [19]
Mercier

[11] 3,920,047
[45] Nov. 18, 1975

[54] GAS FITTING FOR PRESSURE ACCUMULATOR

[76] Inventor: Jacques H. Mercier, 49 Rue de Naples, Paris, France

[22] Filed: Mar. 22, 1974

[21] Appl. No.: 453,599

[52] U.S. Cl. ................................................. 138/30
[51] Int. Cl.² ......................................... F16L 55/04
[58] Field of Search ....................................... 138/30

[56] References Cited
UNITED STATES PATENTS

| | | | |
|---|---|---|---|
| 2,721,580 | 10/1955 | Green .................................. | 138/30 |
| 2,792,022 | 5/1957 | Mercier ................................ | 138/30 |
| 3,067,776 | 12/1962 | Love .................................... | 138/30 |
| 3,232,318 | 2/1966 | Mercier ................................ | 138/30 |
| 3,259,147 | 7/1966 | Mercier et al. ....................... | 138/30 |
| 3,319,658 | 5/1967 | Mercier ................................ | 138/30 |

*Primary Examiner*—John W. Huckert
*Assistant Examiner*—Charles Gorenstein
*Attorney, Agent, or Firm*—Arthur B. Colvin

[57] ABSTRACT

This invention relates to the art of hydraulic accumulators, more particularly of the type including a rigid container having a pair of ports at its respective ends with a deformable bladder separating two fluids such as gas and liquid under pressure. The bladder has a thickened portion at one end with a reduced diameter axial bore therethrough having an annular groove therein in which is releasably positioned the base flange of a substantially cylindrical fitting which contains a gas passage therethrough, the fitting extending through the corresponding port of the container to secure the bladder in position for charging with gas under pressure.

4 Claims, 6 Drawing Figures

GAS FITTING FOR PRESSURE ACCUMULATOR

As conducive to an understanding of the invention, it is noted that hydraulic accumulators of the type including a rigid container having a pair of ports at its respective ends with a deformable bladder separating two fluids such as gas and liquid under pressure, generally having a fitting bonded integrally with one end of the bladder during molding thereof, which fitting extends through one of said ports, the fitting generally carrying a valve by means of which the bladder is charged with gas under pressure.

In order that the fitting will be dependably secured to the bladder during the molding operation, it is necessary that the fitting be sand blasted and furthermore that a bonding material be applied to the fitting to insure that a dependable bond is provided. These operations are time-consuming and relatively expensive.

In addition, after the molding operation has been completed, if the bond is not secure, the fitting must be cut out of the end of the bladder and recleaned for reuse, which operation is time-consuming and expensive since it necessitates destruction of the bladder.

Furthermore, if a bladder should fail in use and must be replaced, either the entire bladder assembly including the fitting must be discarded which is expensive, or the fitting must be cut out of the bladder as above described, which is timeconsuming and hence also adds to the expense.

It is accordingly among the objects of the invention to provide a bladder assembly including a bladder and a gas fitting which may readily be assembled without need for sand blasting of the fitting or the application of any bonding material or glue and with assurance that the fitting will remain dependably secured in the bladder when the bladder assembly is mounted in the gas port of a pressure vessel and which assembly may readily be disassembled for replacement of the bladder with reuse of the same fitting.

According to the invention, these objects are accomplished by the arrangement and combination of elements hereinafter described and more particularly recited in the claims.

In the accompanying drawings in which are shown one of various possible embodiments of the several features of the invention;

Figure 1:
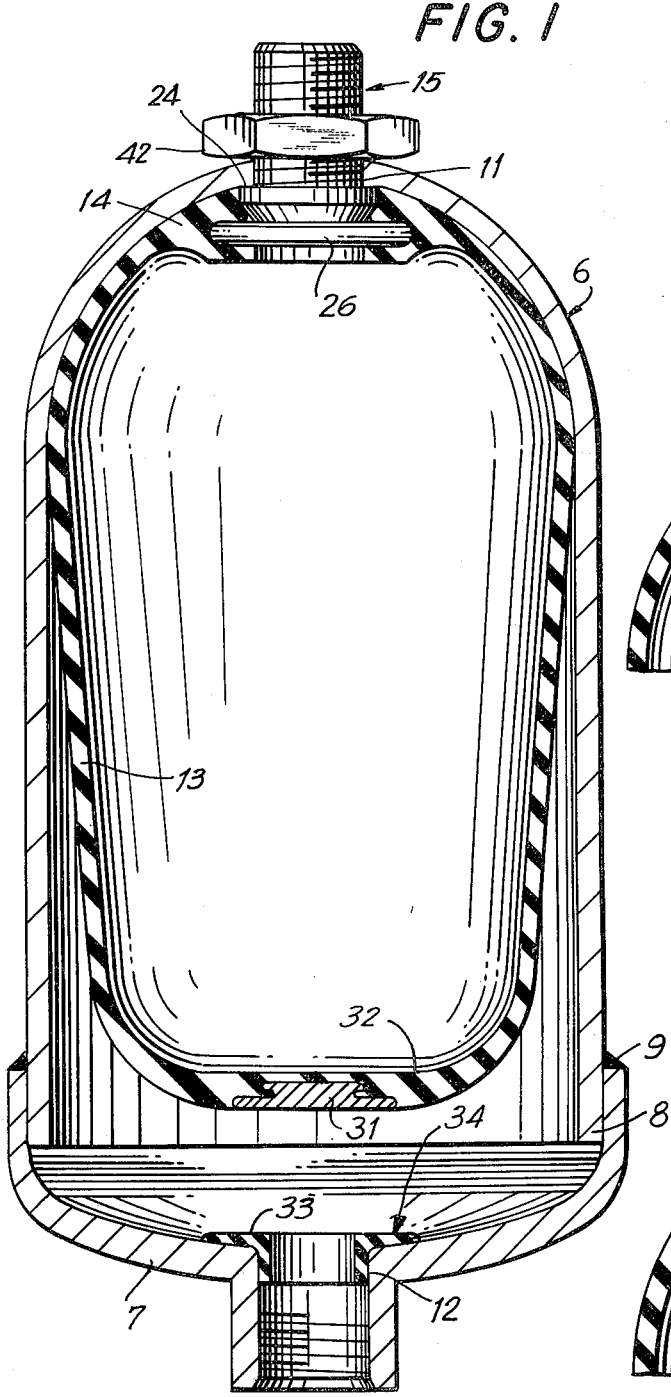
FIG. 1 is a longitudinal sectional view of an accumulator incorporating the invention.

Referring now to the drawings, as shown in FIG. 1, the pressure vessel comprises a container 6 of strong rigid material such as steel, cast aluminum or the like capable of withstanding high pressure.

The container 6 may be cylindro-spherical as shown having a cap 7 encompassing the end 8 of the container and secured thereto as by welding at 9. The container 6 has a pair of ports 11, 12 preferably axially aligned at opposed ends of the container.

A partition 13 is positioned in the container intervening between said ports 11 and 12, defining a variable volume chamber on each side. The partition 13 is in the form of a collapsible and expansible bladder of resilient material such as rubber or synthetic plastic of like physical characteristics, which in distended but substantially unstretched condition is smaller than the cavity of the container 6, and has its longitudinal axis aligned with the ports 11 and 12.

The bladder 13 has a thickened portion 14 at one of its ends in which a fitting 15 is releasably mounted according to the invention.

More particularly, the thickened portion 14 has an axial bore 16 of reduced diameter at its inner end as at 16a defining an annular shoulder 17. The wall of bore 16 has an annular groove 18, the floor 18a of which is in the same plane as annular shoulder 17. Preferably the groove 18 has a rounded periphery as shown. The outer surface 19 of the thickened portion 14 of the bladder 13 has an outstanding annular bead 21 coaxial with bore 16.

The fitting 15 preferably is of metal and comprises a cylindrical externally threaded stem portion 22 rising from a cylindrical hub portion 23 of larger diameter and defining an annular shoulder 24. Depending from the hub portion 23 is a frusto-conical portion 25 formed integral therewith and a base disc 26 is formed integral with portion 25, said base disc having an annular flange 26' with a rounded periphery 26a.

As is clearly shown in FIG. 2, the diameter of the base disc 26 is larger than that of hub 23 and is slightly larger than the diameter of annular groove 18 in thickened portion 14 of the bladder 13 so that it preferably may snugly fit therein as will hereinafter be described. In addition, the diameter of bore 16 is but slightly larger than the diameter of hub 23 also to provide a snug fit.

As shown in FIG. 1, the bladder 13 is substantially frusto-conical in cross section having a valve member or button 31 secured to the closed end 32 thereof and axially aligned therewith. The valve member 32 is designed to seat against the annular flange 33 of a resilient sleeve 34 positioned in port 12, to close said port to prevent extrusion of the bladder.

Figure 2:
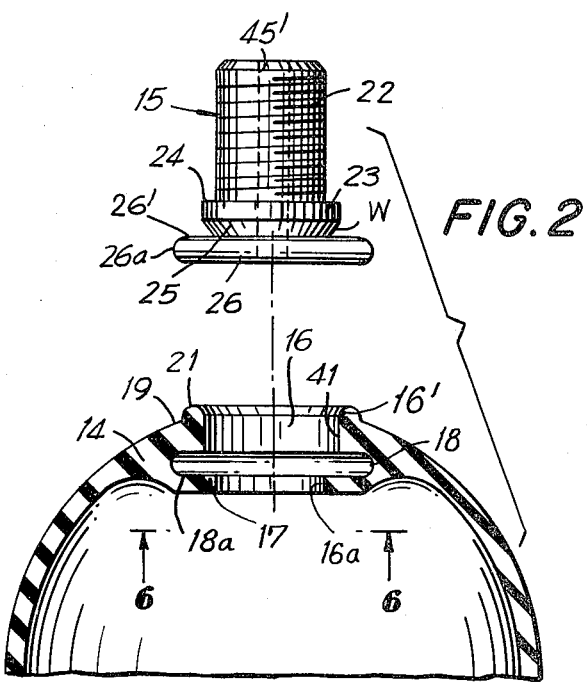
FIG. 2 is an exploded view with parts broken away, showing the bladder and gas fitting prior to assembly.
Figure 3:
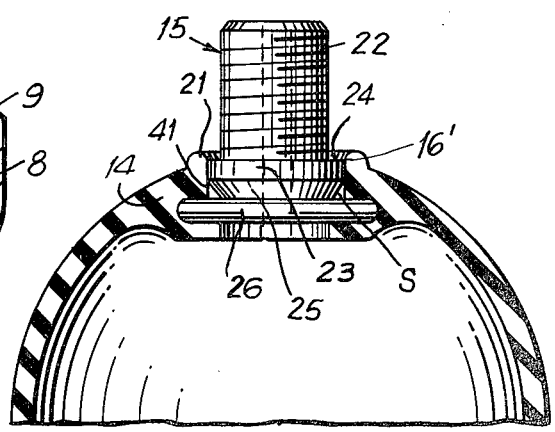
FIG. 3 is a view similar to FIG. 2 with the bladder and gas fitting assembled.

To assemble the pressure accumulator, referring to FIGS. 1 to 3, the disc end 26 of the fitting 15 is inserted through the bore 16 of the bladder to position the periphery of the flange 26' of disc 26 in the annular groove 18.

With the base disc 26 so positioned, the top surface or shoulder 24 of hub 23 will be aligned with the outer end 16' of bore 16 and the annular bead 21 will protrude above the surface of shoulder 24 as shown in FIG. 3.

It is to be noted that with the bladder 13 and fitting 14 thus assembled an annular clearance space S (FIG. 3) will be provided between the wall W of frusto-conical portion 25 and the lower portion 41 of bore portion 16.

The bladder 13 with the fitting 15 mounted thereon is inserted through the open end 8 of the container 6 and the threaded end of stem portion 22 inserted through bore 11 of the container.

Figure 4:
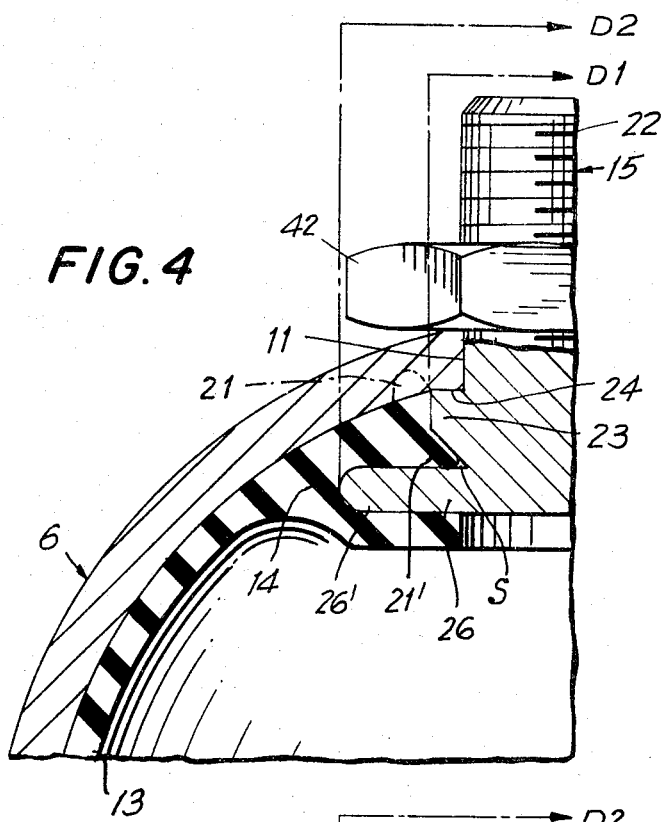
FIG. 4 is a longitudinal sectional view on an enlarged scale with parts broken away showing one end of the accumulator with the bladder assembly mounted therein.

The diameter of bore 11 is such that the annular shoulder 24 of hub 23 will abut against the inner surface of the shell around the periphery of bore 11 as shown in FIG. 4. Thereupon the nut 42 screwed on the threaded stem 22, is tightened, securely retaining the fitting 15 in position.

It is to be noted that during such tightening action of the nut 42, pressure is exerted against the annular bead 21. This will cause the annular bead to be moved inwardly, thereby displacing the bladder material and forcing a corresponding amount thereof into the space S previously described in the manner shown in FIG. 4, where the displaced material is designated by the reference numeral 21'.

To complete the assembly, the cap 7 is positioned over the open end 8 of the container and welded in place as at 9.

Due to the fact that the bore 16 of the bladder is of reduced diameter as at 16a, the resultant provision of annular shoulder 17 defines a retaining seat for the flange portion 26' of base disc 26 so that even if it should be of diameter slightly less than that of annular groove 18, the fitting 15 will remain in fixed position and will not fall into the bladder.

Figure 6:
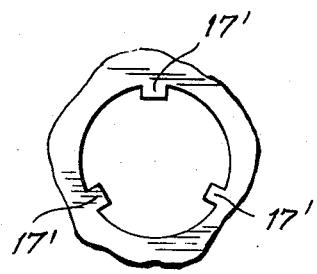
FIG. 6 is a fragmentary sectional view taken along line 6—6 of FIG. 2 showing another embodiment of the invention.

If desired, in molding of the bladder, instead of having a continuous annular shoulder 17, a number of inwardly extending leg portions 17' could be provided as shown in FIG. 6, to restrain inward movement of the fitting 15 into the bladder.

It is further to be noted that by reason of the construction above described, in which the fitting 15 may be dependably yet releasably retained in position in the bore 16 of the bladder, there is no need for bonding the fitting in position during the initial molding of the bladder, which operation would require sandblasting of the fitting and the application of a bonding cement or glue to the portions thereof in contact with the bladder material.

The arrangement above described by reason of the clearance space S permits movement of a portion of the bladder material into such space S so that it functions as an "O" ring to prevent leakage of the gas under pressure charged into the bladder through the axial bore 45 in the fitting.

It is to be noted as shown in FIG. 4, for example, that the bead 21 is positioned between the outer periphery of the flange portion 26' of disc 26 and the outer periphery of shoulder 24, i.e., between the points designated D1 and D2, and preferably adjacent the periphery of shoulder 24.

As a result, when the nut 42 is tightened, since it is difficult for the bead 21 to be displaced toward the left, referring to FIG. 4 by reason of the pressure on the material of the bladder resulting from the sandwiching of such material between the flange portion 26' of disc 26 and the container wall, displacement of the bladder material into the space S will occur, as is desired to provide the "O" ring seal.

Figure 5:
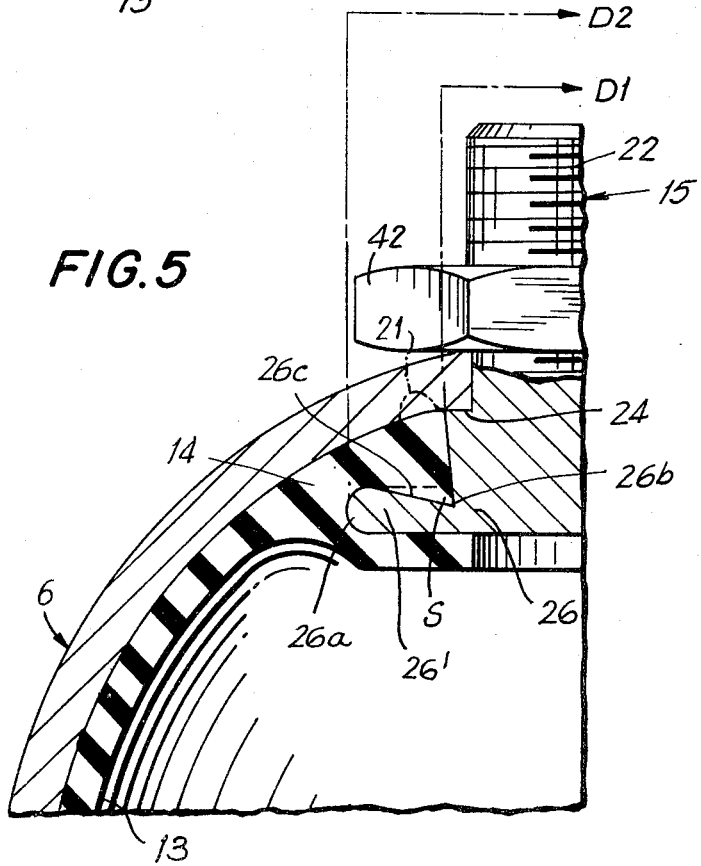
FIG. 5 is a view similar to FIG. 4 of another embodiment of the invention.

The embodiment shown in FIG. 5 is similar to the embodiment shown in FIGS. 1 to 4 inclusive, except that the clearance space S is provided by reducing the thickness of the flange portion 26' of the base disc 26 so that it is of greater thickness at its periphery 26a than at its root end 26b, i.e., the top surface 26c of the flange portion 26' tapers downwardly as shown.

Having thus described the invention, what I claim as new and desire to secure by Letters Patent of the United States is:

1. A bladder assembly for a pressure vessel comprising a bladder and a fitting, said bladder being of resilient deformable material, substantially circular in cross section and having a thickened portion at one end axially aligned with the longitudinal axis of the bladder, said thickened portion having an axial bore therethrough, said axial bore having an annular groove in the wall thereof, said fitting being of rigid material comprising a stem portion with a base disc at one end having an outstanding annular flange of diameter substantially equal to the diameter of said annular groove to be accommodated therein, said fitting having a cylindrical hub portion integral therewith between the root end of the stem portion and said base disc, said hub portion being of diameter greater than that of said stem portion and less than that of said base disc, the junction betwen said hub and the root end of said stem defining an annular shoulder substantially aligned with the plane of the outer end of said axial bore, the outer surface of said bladder adjacent the bore and encompassing the latter having an outstanding annular bead rising above the plane of the annular shoulder defined by the hub and a clearance space defined in said fitting adjacent the inner end of said bore, between the base disc and the adjacent portion of the bladder.

2. The combination set forth in claim 1 in which said fitting has a frusto-conical portion formed integral therewith between said hub and said base disc, the side wall of said frustoconical portion being spaced from the wall of the bore in said bladder when the fitting is mounted therein to provide said clearance space.

3. The combination set forth in claim 1 in which the annular flange of said base disc is of greater thickness at its outer periphery than at its root end, said clearance space being provided between the top surface of said flange and the top surface of said annular groove.

4. The combination set forth in claim 1 in which the lower surface of said annular groove is defined by a plurality of circumferentially spaced legs extending inwardly from the root end of said annular groove.

* * * * *